(12) United States Patent
Miwa et al.

(10) Patent No.: US 9,122,862 B2
(45) Date of Patent: Sep. 1, 2015

(54) PASSWORD INPUT METHOD USING VISUAL OBJECT

(75) Inventors: Kunihiko Miwa, Kanagawa-Ken (JP); Fusanobu Nakamura, Kanagawa-Ken (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 363 days.

(21) Appl. No.: 13/086,093

(22) Filed: Apr. 13, 2011

(65) Prior Publication Data

US 2012/0266236 A1 Oct. 18, 2012

(51) Int. Cl.
*G06F 7/04* (2006.01)
*G08B 29/00* (2006.01)
*H04L 9/32* (2006.01)
*G06F 21/00* (2013.01)
*H04M 1/66* (2006.01)
*G06F 21/36* (2013.01)
*H04L 29/06* (2006.01)
*H04W 12/08* (2009.01)
*G06F 21/31* (2013.01)
*G06F 21/88* (2013.01)
*H04W 12/06* (2009.01)

(52) U.S. Cl.
CPC ............ *G06F 21/36* (2013.01); *G06F 21/31* (2013.01); *G06F 21/88* (2013.01); *H04L 63/08* (2013.01); *H04L 63/083* (2013.01); *H04L 63/0846* (2013.01); *H04W 12/06* (2013.01); *H04W 12/08* (2013.01)

(58) Field of Classification Search
CPC ......... G06F 21/31; G06F 21/88; H04L 63/08; H04L 63/083; H04L 63/0846; H04W 12/06; H04W 12/08

USPC ........ 726/19, 34; 713/168, 182; 455/410, 411
See application file for complete search history.

(56) References Cited

U.S. PATENT DOCUMENTS

| | | | |
|---|---|---|---|
| 8,196,198 B1 * | 6/2012 | Eger | 726/21 |
| 8,904,479 B1 * | 12/2014 | Johansson et al. | 726/2 |
| 2007/0277224 A1 * | 11/2007 | Osborn et al. | 726/2 |
| 2009/0077645 A1 * | 3/2009 | Kottahachchi | 726/9 |
| 2009/0227232 A1 | 9/2009 | Matas et al. | |
| 2009/0307768 A1 * | 12/2009 | Zhang et al. | 726/19 |
| 2010/0197344 A1 * | 8/2010 | Song et al. | 455/556.2 |
| 2010/0325721 A1 * | 12/2010 | Bandyopadhyay et al. | 726/19 |
| 2011/0213855 A1 * | 9/2011 | King | 709/217 |
| 2012/0015629 A1 * | 1/2012 | Olsen et al. | 455/411 |
| 2012/0036556 A1 * | 2/2012 | LeBeau et al. | 726/3 |
| 2012/0159616 A1 * | 6/2012 | Griffin et al. | 726/19 |
| 2013/0031619 A1 * | 1/2013 | Waltermann et al. | 726/8 |

FOREIGN PATENT DOCUMENTS

| | | |
|---|---|---|
| JP | 2002-339948 A | 6/2002 |
| JP | 2002-517841 A | 6/2002 |
| WO | WO 99/63492 | 12/1999 |

\* cited by examiner

*Primary Examiner* — Aravind Moorthy
(74) *Attorney, Agent, or Firm* — Shimokaji IP

(57) ABSTRACT

A method and apparatus is provided for switching from a regular desktop screen to a password input screen for a user to input a password. An apparatus may comprise a first screen display as the password input screen, a second screen display as the regular desktop screen, and a switching system. The switching system may be configured to switch a screen item position between the first screen display and the second screen display. The switching system may receive a user selection of a sequence of screen items as a password input and may switch operation of the apparatus between the first screen display to the second screen display.

12 Claims, 4 Drawing Sheets

PASSWORD INPUT METHOD USING VISUAL OBJECT

BACKGROUND OF THE INVENTION

The present invention relates generally to methods and systems which facilitate user authentication in a computing system, and, more specifically, to methods and systems for authenticating users based on selection of a plurality of icons displayed to the user.

In computer systems, access to particular features, data, physical locations and the like is often protected through a password authentication process. A user enters a password through a user interface, and the computer system verifies the user's password prior to allowing the user access to a secured item. Typically, a password is comprised of a combination of alphanumeric characters inputted to the computer system through a keyboard, keypad, touch screen, mouse or the like. In this type of authentication system, there are a variety of ways for another person to obtain knowledge of the user's password, potentially compromising the authentication process. For example, an onlooker may see the particular keys that the users utilize to enter their password, thus, obtaining access to their password.

The problem may be further exacerbated through systems that lack dedicated keyboards, keypads and the like. For example, a smart phone may not have any numeric buttons, and thus, a user may enter data through a virtual keyboard, or keypad displayed on the smart phone screen. However, this type of data entry technique is problematic for inputting passwords and other sensitive data, because the password input screen is easy to recognize and any person within the line of sight of the screen may see the keys of the virtual keyboard actuated by the user, thus obtaining access to the user's password.

Therefore, it can be seen that there is a need for a secure method and system of inputting a password.

SUMMARY

In one aspect, an apparatus comprises a switching system that is configured to receive a user selection of a sequence of screen items shown on a first screen display as an input; and switch operation of the apparatus from the first screen display to the second screen display after verifying the input is correctly entered.

In another aspect, a method comprises presenting a plurality of screen items to a user on a first screen display; receiving a user selection of at least one of the screen items; and determining whether to permit the user access to a secured item based on the user selection.

In a further aspect, a computer readable medium having computer usable program code embodied therewith, the computer program code comprises computer program code configured to switch operation between a first screen display and a second screen display, wherein the first screen display and the second screen display have a plurality of screen items; and computer program code configured to verify a user selection of screen items before switching operation from the first screen display to the second screen display.

These and other features, aspects and advantages of the present invention will become better understood with reference to the following drawings, description and claims.

DETAILED DESCRIPTION OF EMBODIMENTS

Figure 1A:
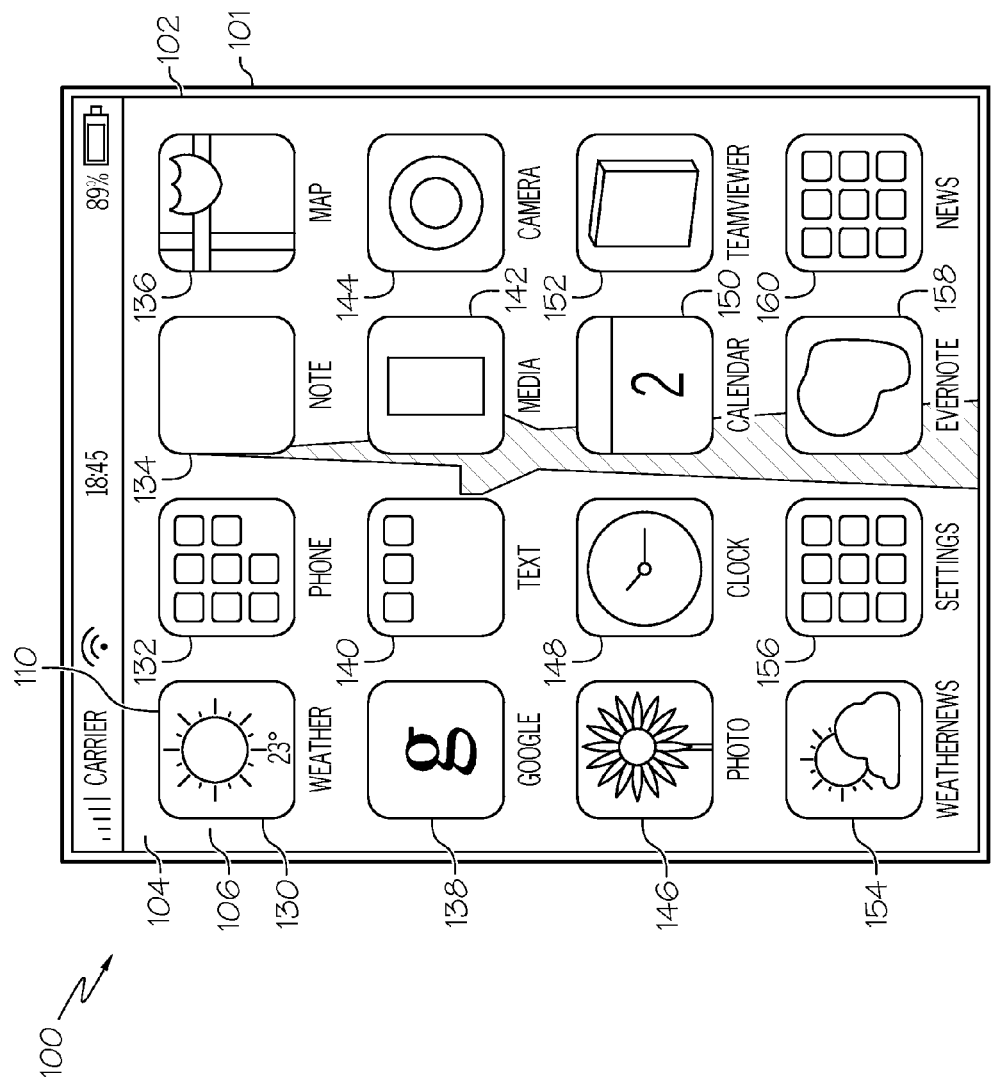
FIG. 1A is an exemplary embodiment of a device with a screenshot of a first screen display for a user to input a password.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide secure methods and systems for inputting a password. Exemplary embodiments may include a switching system having one or more computer hardware and/or software systems which control switching between a first screen display and a second screen display. More specifically, instead of inputting an alphanumeric password, a user may touch icons on the first screen display in a predetermined sequence. When the control system receives the user's input, it may verify the user's authentication. Upon verifying, the control system may grant the user access to the second screen display, which may be a real desktop display. Each time the user logs in, the switching system may shuffle the icons shown on the first screen display. The user may find the same icon in a different place when the user logs in. Because icons may be shuffled each time a user logs in, it is less likely that an onlooker could memorize the password by watching the user's finger movement. Onlookers may not even realize the user is inputting a password because the password input screen looks like a regular operational screen (with various icons) of the device.

Exemplary embodiments may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, exemplary embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction performance system, apparatus, or device.

Computer program code for carrying out operations of exemplary embodiments may be written in any combination of one or more programming languages, including an object oriented programming language such as Java™, Smalltalk™, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1A is an exemplary embodiment of a device 100 with a screenshot of a first screen display 104 (e.g., password input screen) for a user to input a character, such as a password. The device 100 may be, for example, a handheld computer, a server, a personal digital assistant, a cellular telephone, a network appliance, a camera, a smart phone, a network base station, a media player, a navigation device, an e-mail device, a game console, a television receiver (e.g., a satellite or cable television set-top box), a digital-video-recorder (DVR), an automatic teller machine (ATM), a security system (e.g., a door or gate access system), or a combination of any two or more of these data processing devices or other data processing devices. In other words, the device 100 may comprise any type of electronic device, general purpose computing device or special purpose computing device that includes a processor, other circuitry, or logic operable to perform the pictorial authentication process described herein to control access to a secured item.

Figure 1B:
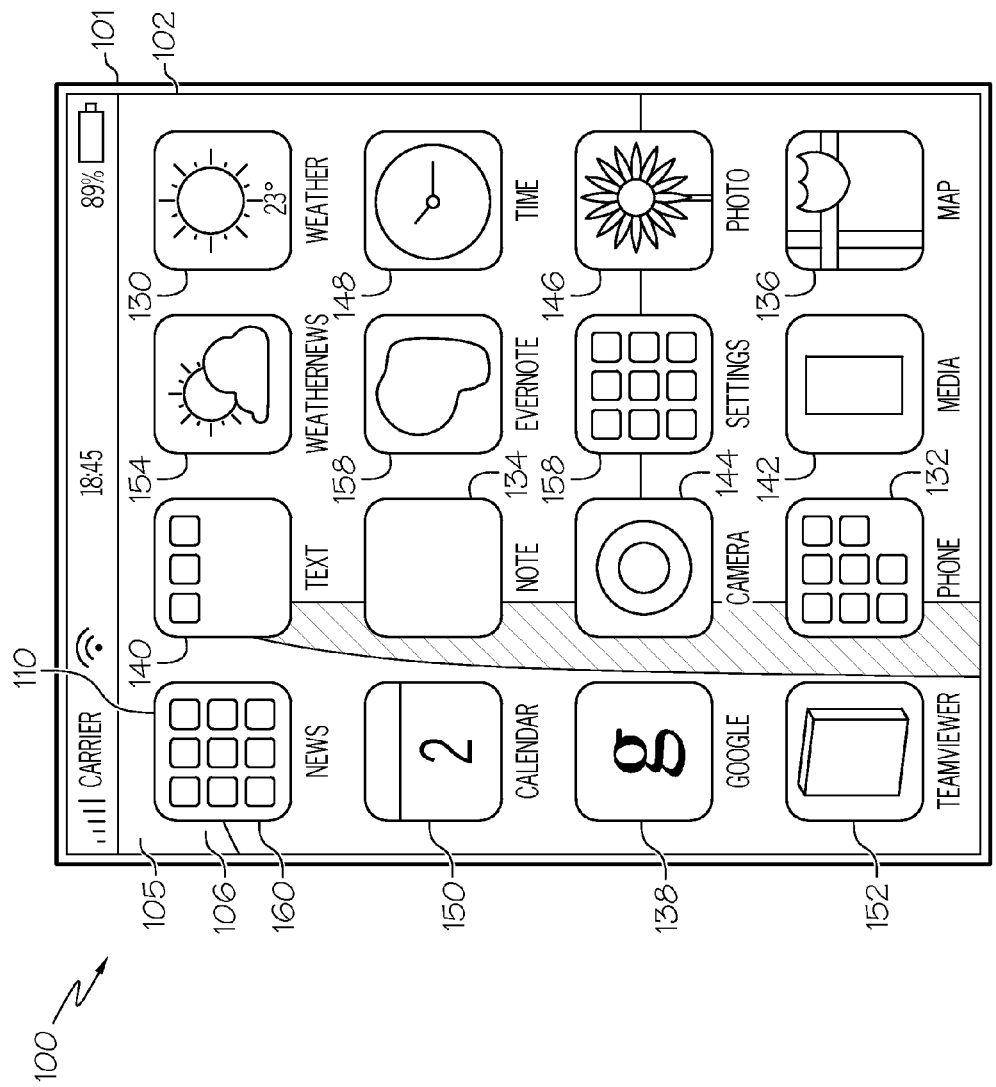
FIG. 1B is an exemplary embodiment of a device shown in FIG. 1A with a screenshot of a second screen display.

In some embodiments, the device 100 may include a display device 101, which may be operable to present the first screen display 104 and a second screen display 105 (shown in FIG. 1B). The device 100 may comprise other elements, parts or components not illustrated for the sake of brevity. The display device 101 may be a touch screen 102. The touch screen 102 may be implemented with liquid crystal display (LCD) technology, light emitting polymer display (LPD) technology, or some other display technology. The touch screen 102 may be sensitive to haptic and/or tactile contact with a user.

In some implementations, the touch screen 102 may comprise a multi-touch-sensitive display. A multi-sensitive display may, for example, process multiple simultaneous touch points, including processing data related to the pressure, degree, and/or position of each touch point. In some implementations, the device 100 may display one or more graphical user interfaces 109 on the touch-sensitive display 102 for providing the user access to various system objects and for conveying information to the user.

In some implementations, the first screen display 104 may include a plurality of screen items, such as a background display 106 (also known as wallpaper), and a weather icon 130, a phone icon 132, a note icon 134, a map icon 136, a Google® icon 138, a text icon 140, a media icon 142, a camera icon 144, a photo icon 146, a clock icon 148, a calendar icon 150, a TeamViewer® icon 152, a weather news icon 154, a settings icon 156, an Evernote® icon 158, and a news icon 160. The icons may be arranged in a grid pattern comprising a plurality of columns and rows. Rows and/or columns may be straight, curved, or otherwise. In other exemplary embodiments, icons may be arranged in various other patterns and layouts. The user may preset a new password by selecting a sequence of icons and storing the sequence in the device 100.

Still in FIG. 1A, a user may press on a plurality of icons 110 to gain access to the device 100. As an example, the user may touch the map icon 136, the Google® icon 138, the clock icon 148, and the news icon 160 in a sequence. If the sequence of icons matches the stored password, the device 100 may present the user the second screen display 105 (shown in FIG. 1B), on which a real desktop screen may be shown. Alternatively, instead of touching icons, the user may draw a line connecting two or more icons, thus indicating the two or more icons in a sequence as a password input. For example, the user may draw a line from the weathernews icon 154 to the clock icon 148 without touching the two icons to indicate the password input of the weathernews icon 154 and the clock icon 148. In a further password input method, the user may draw a first line perpendicular to a second line connecting two icons to indicate the password input of two icons of both side of the second line. For example, the user may draw a line from the weathernews icon 154 to the clock icon 148 to indicate the password input of the photo icon 146 and the settings icon 156 since the line connecting between the photo icon 146 and the settings icon 156 is vertical to the drawn line connecting between the clock icon 148 and the weathernews icon 154. Other password input methods may be used in addition to above three described methods.

Compared to FIG. 1B, in one exemplary embodiment, a combination of icons on the first screen display 104 may be the same as and may have been shuffled from the icons on the second screen display 105. In another exemplary embodiment, the icons on the first screen display 104 may be different from the icons in the second screen display 105 in FIG. 1B. In still other exemplary embodiments, the icons on the first screen display 104 may include some of the icons found on the second screen display 105. For example, the news icon 160 may be switched from the first row in FIG. 1B to the fourth row in FIG. 1A and moved to the position where the map icon 136 used to occupy, for example. The text icon 140 may be shuffled from the first row in FIG. 1B to the second row in FIG. 1A and moved to the area where the note icon 134 used to occupy, for example. In this way, an onlooker may not easily notice the shuffled icons between the first screen display shown in FIG. 1A and the second screen display shown in FIG. 1B. The icons may be shuffled in a random order or a predetermined order.

Referring to FIG. 1B, in one exemplary embodiment, the background display 106 in FIG. 1B may be the same as the background display 106 shown in FIG. 1A. In another exemplary embodiment, the background display 106 in FIG. 1B may be different from that shown in FIG. 1A. The difference in the background display 106 from the first screen display 104 and the second screen display 105 may help the user to know which screen display is the first screen display 104 (password input screen) and which screen display is the second screen display 105 (real desktop screen). However, for an onlooker, it may not be obvious to discern the subtle difference between the two screen displays because the shuffled icons and changed background display do not give a user or an onlooker a sudden change of a desktop image.

Figure 2:
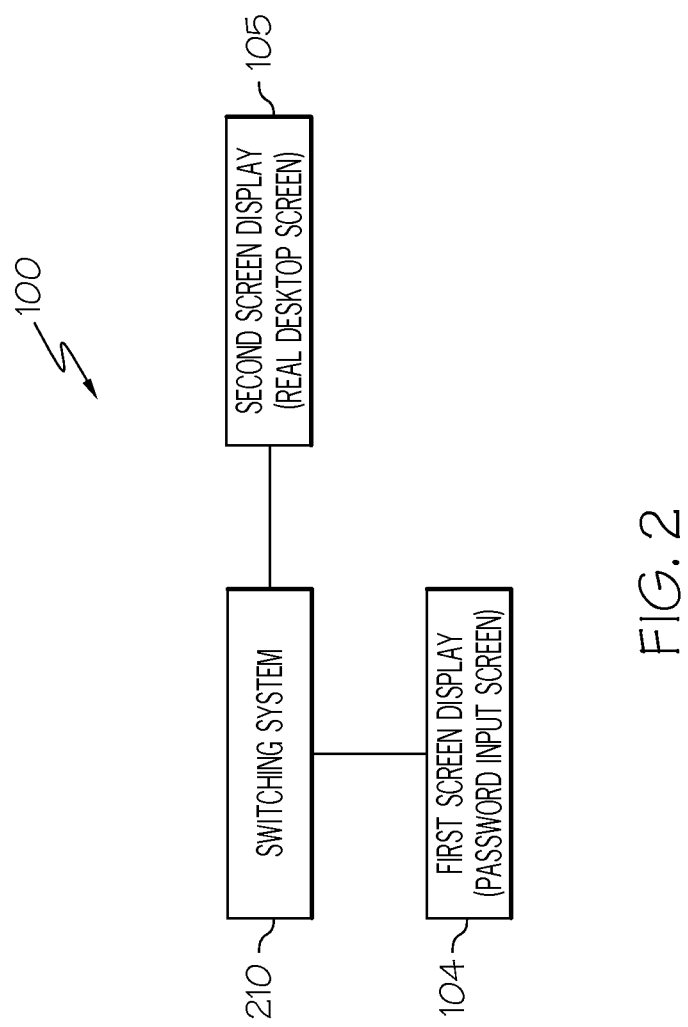
FIG. 2 is a functional block diagram describing a process carried out by a switching system.

Referring to FIG. 2, the device 100 may include a switching system 210, the first screen display 104 shown in FIG. 1A, and the second screen display 105 shown in FIG. 1B. The switching system 210 may have one or more computer software and/or hardware systems which control switching between the first screen display 104 and the second screen display 105. The switching system may switch a screen item between the first screen display and the second screen display. In one embodiment, screen items may include a background display 106 and a plurality of icons 110, for example. In another exemplary embodiment, screen items may further include a plurality of images, such as composite images.

The switching system may sense contact with the touch screen and receive the user's selection of screen items, such as icons, as a password input. Then the switching system may compare the password input with the stored password. After the switching system verifies the password input, it may permit the user to access the second screen display 105. After the user stops using the device 100 for a predetermined period, such as 5 minutes, for example, the device may be in suspend mode for power saving. When the device comes back to operation, the switching system may switch operation from the second screen display to the first screen display, presenting the user switched icons. As an example, the news icon 160 in FIG. 1B may switch with the map icon 136, which in turn may switch with the weather icon 130 as shown in FIG. 1A. In the mean time, the switching system may disable the icon's regular function for the first screen display (password input screen), e.g., the user may not start a program by touching the icon, for example.

The device 100 may be configured to restrict access by a user to a secured item. The secured item may be a feature of the device 100, such as data stored internally within the device 100, a physical location (e.g., a locked room) and the like that has controlled access based on authentication of the user. In another embodiment, the secured item comprises access to the device 100. In other words, the user may be required to input a password in order to log in and utilize the software of the device 100. Password authentication processes may be utilized to control access to many types of operating systems, such as the MICROSOFT WINDOWS® operating system. The secured item may also comprise access to a more limited set of software applications on the device 100. For example, the user may provide authentication information to access an e-mail program on the device 100. In other embodiments, the secured item may be data on the computer that has limited access based on proper authentication of the user. In at least one embodiment, the secured item may be a hardware feature or component of the device 100. For example, the user may provide authentication information to access an input and/or output port of the device 100, such as universal serial bus (USB), for example.

Figure 3:
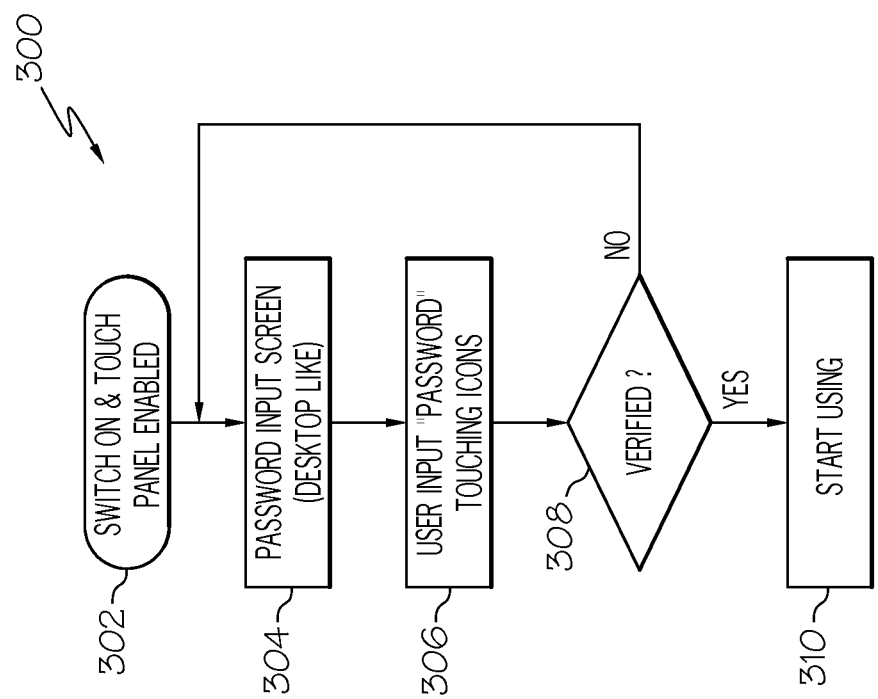
FIG. 3 a flow diagram of an exemplary process for user selection of a pictorial password on a device.

Referring to FIG. 3, the user may switch on the device 100 if the power is off in a step 302. Alternatively, if the device 100 is in a suspend mode for power saving, the user may enable the touch panel by touching the screen. The process 300 may further include presenting a user with a plurality of screen items on the first screen display in a step 304.

The process further includes the user inputting a "password" by touching icons in a predetermined sequence on the touch screen in a step 306. Alternatively, the step 306 may be accomplished by using a stylus. After the switching system receives a user selection of screen items as a password input, the switching system may verify the user's selection of the screen items as the password input in a step 308. The password input may be compared with a preset password. If there is a match, the switching system may grant the user access the secured item, e.g., the second screen display. The user may start using the second screen display in a step 310. If there is no match, the switching system may shuffle a combination of screen items, such as icons, and present the password input screen to the user. The user may repeat the step 304.

It should be understood, of course, that the foregoing relate to exemplary embodiments of the invention and that modifications may be made without departing from the spirit and scope of the invention as set forth in the following claims.

We claim:

1. An apparatus, comprising:
a switching system that is configured to:
store data regarding a first sequence of icons that are graphical user interface (GUI) objects, wherein the first sequence is selected by the user, wherein the first sequence is other than a user selected drawing pattern of icons;
prevent user access to icons on an operational screen, wherein the icons on the operational screen are in an operational pattern and wherein the icons on the operational screen are functional;
allow user access to icons on a password input screen, wherein the access is only for entire icons and not partial icons, wherein the icons on the password input screen are in a password pattern and wherein the icons on the password input screen are non-functional;
receive data regarding a second sequence of icons selected by the user on the password input screen, wherein the user selection is other than a user drawn pattern of icons;
compare the data regarding the second sequence with the data regarding the first sequence; and
only if the compared data matches, then allow user access to the icons on the operational screen.

2. The apparatus of claim 1, wherein the switching system switches a position of the icons when allowing user access from the password input screen to the operational screen.

3. The apparatus of claim 1, wherein the plurality of the icons on the password input screen are displayed randomly.

4. The apparatus of claim 1, wherein the switching system verifies user authentication through the user selection of the icons on the password input screen.

5. A method, comprising:
- storing a sequence of icons that are graphical user interface (GUI) objects, wherein the sequence is other than a user drawn pattern of icons that is of a connect-the-dot type drawing;
- preventing access to all icons on an operational screen, wherein icons on the operational screen are functional and arranged in an operational pattern;
- presenting icons to a user on a password screen, wherein all icons on the password screen are non-functional and arranged in a password pattern, and wherein the password pattern is different from the operational pattern;
- receiving a sequence of user selected icons on the password screen, wherein the user selection is other than a connect-the-dot type drawing;
- comparing the received sequence of user selected icons with the stored sequence of icons;
- determining whether the received sequence of user selected icons matches the stored sequence of icons; and
- only upon determining a matching of the received and stored sequences, then switching user access from the password screen to the operational screen;
- changing the password pattern when the password screen is again accessed.

6. The method of claim 5 further comprising shuffling a combination of icons when presenting the password screen.

7. The method of claim 5, further comprising presenting the password screen to the user again if the user is not permitted to access to the operational screen.

8. A computer program product comprising a non-transitory computer readable medium having computer usable program code embodied therewith, the computer usable program code being configured to:
- switch operation between a first screen display and a second screen display of a device, wherein the first screen display and the second screen display have a plurality of screen items, wherein the screen items on the first screen display are arranged in a first pattern, wherein the screen items on the second screen display are arranged in a second pattern, and wherein the first pattern is different from the second pattern;
- compare a user entered sequence of screen items with a previously stored sequence of a selection of screen items, wherein the previously stored selection is other than a drawing pattern of screen items, and wherein the user entered sequence is other than a dragging action of a drawing pattern of screen items;
- verify that the user entered sequence matches the previously stored sequence before switching operation from the first screen display to the second screen display;
- switch from the first screen display to the second screen display showing the plurality of the screen items shown on the first screen display, wherein the plurality of the screen items have functionality when on the second screen display;
- disable functionality of the plurality of the screen items before switching from the second screen display to the first screen display; and
- change the first pattern when the first screen display is again accessed.

9. The computer program product of claim 8, the computer usable program code being configured to present the first screen display to the user again if the user entered sequence does not match the previously stored sequence.

10. The computer program product of claim 8, the computer usable program code being configured to switch from the second screen display to the first screen display when the user stops using the device for a predetermined time.

11. The computer program product of claim 8, the computer usable program code being configured to present the first screen display when the device is turned on.

12. The computer program product of claim 8, the computer usable program code being configured to shuffle a combination of screen items when presenting the second screen display.

* * * * *